UNITED STATES PATENT OFFICE.

HAROLD S. BOOTH AND GEORGE G. MARSHALL, OF CLEVELAND, OHIO.

PROCESS OF RECOVERING AN ELEMENT CAPABLE OF FORMING A HALOID FROM ORES, MINERALS, &c., CONTAINING THE SAME.

1,392,044. Specification of Letters Patent. Patented Sept. 27, 1921.

No Drawing. Application filed November 26, 1917. Serial No. 204,003.

*To all whom it may concern:*

Be it known that we, HAROLD S. BOOTH and GEORGE G. MARSHALL, citizens of the United States, and residents, respectively, of Cleveland, in the county of Cuyahoga and State of Ohio, and Cleveland, in the county of Cuyahoga and State of Ohio, have invented a certain new and useful Improvement in Processes of Recovering an Element Capable of Forming a Haloid from Ores, Minerals, &c., Containing the Same, of which the following is a full, clear, and exact description.

This invention relates to a process for recovering an element occurring in chemical combination in an ore, mineral, or other material, which element is capable of reacting with a haloid of the alkali metal group or alkaline earth metal group to form a haloid. The process is particularly useful when applied to the recovery of aluminium or similar elements although the process in the various steps involved is not limited to the recovery of this element alone.

Furthermore, the process is of importance particularly to the treatment of certain ores, minerals and materials containing along with the element to be recovered, potassium and other similar valuable elements, in that by the process defined such elements may be also recovered.

The process will be disclosed in connection with the recovery of aluminium from an aluminium bearing ore, mineral, or material without in any way tending to limit the process thereby.

Aluminium occurs in nature in many forms, the most common perhaps being clay, bauxite, various felspars, and other combinations.

The process involved is applicable to all of the materials with which I am familiar. In carrying out the process, if the material being treated normally does not contain sufficient silica (usually occurring as a silicate), silica must be added, and in the event that the material to be treated contains more silica than that required in the reaction involved in the process, sufficient flux must be added to take care of the excess of silica. Such fluxes as are used are well known, to-wit, oxids or carbonates of alkaline earth metals or alkali metal carbonates such as calcium oxid, calcium carbonate, magnesium oxid, magnesium carbonate, etc.

In practising the process, particularly where an electric furnace is used, which is the preferable form of furnace, it is advisable to mix a small proportion of carbon with the furnace charge, the carbon being in some form capable of conducting an electric current such as coke. The charge also contains an alkali metal haloid or a haloid of an alkaline earth metal, examples of which respectively are sodium chlorid and calcium chlorid.

For the purpose of disclosing the process, we may consider the treatment of the mineral known as kaolinite. This material being deficient in its silica content, for the purposes of the process requires that some silica be added as a part of the furnace charge. There will also be added a haloid such as calcium chlorid and a small amount of carbon.

The materials thus employed are preferably previously calcined, although we shall later show this is not entirely necessary.

The mixture is charged into a suitable furnace, preferably an electric furnace, and heated to a temperature at which reaction between the various elements involved would proceed with the formation of aluminium chlorid. The temperature at which the reaction proceeds will vary, due to varying conditions of materials, but will be in the neighborhood of 1200° C.

Empirically expressed, the reaction involved in the performance of the process just outlined would be as follows:—

$$Al_4(SiO_4)_3 + 6CaCl_2 + 3SiO_2 + (C) = 6CaSiO_3 + 4AlCl_3 + (C)$$

The temperature at which the reaction proceeds and at which it is carried may be less than the temperature at which any of the materials employed will volatilize, hence, when the reaction is complete the aluminium chlorid formed would be found in the fused material.

This fused material may be run into water while fused, and inasmuch as it is largely composed of calcium silicate it will be disintegrated and the aluminium chlorid dissolved in the water, which preferably is slightly acidulated with hydrochloric acid.

From the solution of aluminium chlorid, the aluminium chlorid may be separated and metallic aluminium or aluminium in any other form obtained from the aluminium chlorid.

The foregoing reaction will take place in the same manner if sodium chlorid be used instead of calcium chlorid.

As before stated, and as shown in the reaction, the carbon added is primarily to increase the electrical conductivity of the mass. However, it may be utilized to assist in the reaction by virtue of its reducing power. Under such circumstances the decomposition of kaolinite will proceed in accordance with the following reaction:

$$Al_4(SiO_4)_3 + 6CaCl_2 + 9(C) = $$
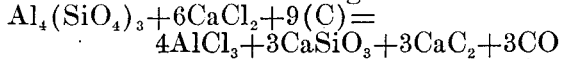
$$4AlCl_3 + 3CaSiO_3 + 3CaC_2 + 3CO$$

The carbids formed in all probability undergo decomposition, and immediately upon the fused mass being poured into water.

Where it occurs that there is an excess of silica already contained in the material to be treated, a basic flux may be added to take care of this excess. As an example of a reaction proceeding under these circumstances, the following example of the decomposition of a feldspar is given:

$$K_2O.Al_2O_3.6SiO_2 + 4CaCl_2 + 2CaO =$$
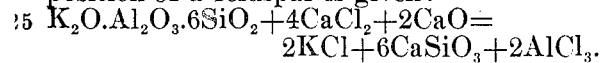
$$2KCl + 6CaSiO_3 + 2AlCl_3.$$

In the example just given, the calcium oxid added takes up the excess silica not necessary to the decomposition of calcium chlorid.

In the last example given, potash occurs in the material treated, and it will be seen that the potash appears as a product of the reaction in the form of a chlorid. This chlorid will be contained in the mass of fused material remaining in the furnace, and may be recovered by a leaching process along with the aluminium chlorid formed when the fused mass remaining in the furnace is disintegrated and subjected to a leaching action.

The potassium chlorid may be subsequently recovered from the solution.

There are other aluminium bearing materials containing other valuable elements which may be recovered as by-products in the same manner as described with respect to the potassium.

In the event that the mixture of materials employed is not thoroughly dried before proceeding with the process, or to state it conversely, if moisture be present in the materials entering into the furnace charge, the chlorid of aluminium formed will be hydrolyzed either in part or in whole in accordance with the amount of water that may be present in the materials of the furnace charge.

If sufficient water be present, the entire amount of aluminium chlorid will be hydrolyzed and there will be freed from the furnace charge hydrochloric acid gas which of course may be collected if desired. The extent of the hydrolysis may be controlled or prevented entirely by running in hydrogen chlorid gas through the reacting materials during the reaction, is excess.

The hydrolyzed material, which is thus left in the fused mass, is easily soluble in dilute acids, and may be separated from the fused mass by leaching with water or steam to remove the nonhydrolyzable chlorids (such as potassium chlorid) and then leaching the residue with acids to remove the aluminum oxid.

In the operation of the process as described heretofore, the alkali metal haloid or alkaline earth metal haloid, is decomposed, forming chlorin in its nascent form, so that the element is free to combine with the aluminum. It is very well known that the nascent form of any element is more active chemically than when in its molecular form, hence, in this process the nascent chlorin if the halogen used be a chlorid, is much more active than would be the case where chlorin gas from an outside source would be caused to pass to the material being fused, because of course, chlorin gas when thus passed would be in its molecular condition. The foregoing fact is of material importance in the process and the efficiency with which the reaction takes place as the process proceeds.

Furthermore, the use of a halogen salt makes the cost of recovering the desired element by the process much cheaper than where gaseous chlorin is introduced, and attended with less difficulties due to escape of poisonous gas.

In the specification, calcium chlorid has been given some prominence in the reactions stated, and this is because of the fact that calcium chlorid is formed in large quantities, as a by-product in certain processes, and up to the present time no commercial use has been found which will take care of the quantities produced. It is believed that this process may utilize in part at least, this by-product of calcium chlorid.

A typical reaction occurring in the performance of the process when applied to treatment of clays, is herewith given where the moisture has been previously removed from the material:

$$Al_2O_3.2SiO_2 + 3CaCl_2 + SiO_2 =$$
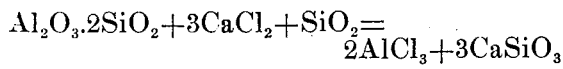
$$2AlCl_3 + 3CaSiO_3$$

In the case of bauxite the following reaction would take place in the performance of the process, assuming the moisture to be removed from the material.

$$Al_2O_3 + 3CaCl_2 + 3SiO_2 = 3CaSiO_3 + 2AlCl_3$$

Examples of the reaction taking place as the process proceeds when feldspars are utilized as a source of material have heretofore been given; further reactions need not be given, although feldspars which may contain aluminium in connection with sodium, lithium, zerconium, etc., will respond to the process with equal facility.

Further reactions need not be given, although materials which may contain aluminium in connection with sodium, lithium, zerconium, etc., will respond to the process with equal facility.

Other elements than aluminium will also respond to the process, where the element alone is contained in the material, or in combination with other elements, to-wit, lithium, rubidium, calcium, cerium, thorium, manganese, cobalt, etc.

It will be clear from the reactions which have been given in connection with the performance of the process that the quantity of halogen salt and silica, if such be necessary, or the quantity of basic flux, if that be necessary, to be added to the ore or other material treated, can readily be calculated in accordance with the empirical reaction formulæ which have heretofore been stated.

Having described our invention, we claim:

1. The process which consists in mixing material containing aluminum with a haloid which will react with said material, having silica present, having the materials in anhydrous condition, heating the mixture to a temperature at which reaction proceeds, and a haloid of aluminum is formed, but short of the temperature at which the haloid of aluminum will volatilize, and leaching the haloid of aluminum from the mass produced by the process.

2. The process which consists in mixing material containing aluminum with a chlorid which will react with the said material, having silica present in the mixture and having the mixture in anhydrous condition, heating the mixture to a temperature at which reaction proceeds and aluminum chlorid is formed but short of the temperature at which aluminum chlorid is volatilized, and leaching the chlorid of aluminum formed from the mass produced by the process.

3. The process which consists in mixing material containing aluminum with a haloid of an alkali metal or alkaline earth metal, having silica present in the mixture, and having the mixture in anhydrous condition, heating the mixture to a temperature at which reaction proceeds, and a haloid of aluminum is formed, but short of the temperature at which the haloid of aluminum will volatilize, and leaching the haloid of aluminum formed from the mass produced by the process.

4. The process which consists in mixing material containing aluminum with a chlorid of an alkali metal or alkaline earth metal, having silica present in the mixture and having the mixture in anhydrous condition, heating the mixture to a temperature at which reaction proceeds and aluminum chlorid is formed but short of the temperature at which aluminum chlorid is volatilized, and leaching the chlorid of aluminum from the mass produced by the process.

5. The process which consists in mixing a silicate containing aluminum with a haloid capable of reacting with said silicate, having the mixture in anhydrous condition, heating the mixture to a temperature at which reaction proceeds and a haloid of aluminum is formed but short of the temperature at which the haloid of aluminum volatilizes, and leaching the haloid of aluminum formed from the mass produced by the process.

6. The process which consists in mixing a silicate containing aluminum with a chlorid capable of reacting with the silicate, having the mixture in anhydrous condition, heating the mixture to a temperature at which reaction proceeds and aluminum chlorid is formed but short of the temperature at which aluminum chlorid is volatilized, and leaching the aluminum chlorid formed from the mass produced by the process.

7. The process which consists in mixing a silicate containing aluminum with a haloid of an alkali metal or alkaline earth metal, having the mixture in anhydrous condition, heating the mixture to a temperature at which reaction proceeds and a haloid of aluminum is formed but short of the temperature at which the haloid of aluminum would be volatilized, and leaching the haloid of aluminum formed from the mass produced by the process.

8. The process which consists in mixing a silicate containing aluminum with a chlorid of an alkali metal or alkaline earth metal, having the material in anhydrous condition, heating the mixture to a temperature at which reaction proceeds and aluminum chlorid is formed but short of the temperature at which aluminum chlorid is volatilized and leaching the haloid of the element formed from the mass produced by the process.

In testimony whereof we hereunto affix our signatures in the presence of a witness.

HAROLD S. BOOTH.
GEORGE G. MARSHALL.

Witness:
L. D. ROSKELLY.